United States Patent [19]

Moore

[11] 3,790,051

[45] Feb. 5, 1974

[54] SEMICONDUCTOR WAFER FRACTURING TECHNIQUE EMPLOYING A PRESSURE CONTROLLED ROLLER

[75] Inventor: Arthur H. Moore, Fillmore, Calif.

[73] Assignee: Radiant Energy Systems, Inc., Newbury Park, Calif.

[22] Filed: Sept. 7, 1971

[21] Appl. No.: 178,275

[52] U.S. Cl. .......... 225/1, 225/2, 225/93, 225/96.5, 225/103

[51] Int. Cl. .......... B26f 3/00

[58] Field of Search .......... 225/96.5, 2, 1, 93, 103; 29/413

[56] References Cited

UNITED STATES PATENTS

| | | | |
|---|---|---|---|
| 3,601,296 | 8/1971 | Pick | 225/96.5 X |
| 3,448,510 | 6/1969 | Bippus et al. | 225/2 X |
| 3,237,499 | 3/1966 | Lohrand et al. | 83/510 |
| 3,528,335 | 9/1970 | Andolsek | 83/510 X |
| 2,121,003 | 6/1938 | Balfe | 83/510 X |
| 3,206,088 | 9/1965 | Meyer et al. | 225/2 |
| 3,559,855 | 2/1971 | Barnett et al. | 225/96.5 X |
| 3,565,306 | 2/1971 | St. Louis | 225/93 X |
| 3,626,492 | 12/1971 | Hobbs | 225/96.5 X |

*Primary Examiner*—Frank T. Yost
*Attorney, Agent, or Firm*—Limbach, Limbach & Sutton

[57] ABSTRACT

A technique for fracturing a scribed wafer into its individual electronic circuit dice wherein a roller is passed over the wafer two times in paths that are 90° to one another, the force of the roll during the second pass being less than the force of the roll during the first pass over the wafer. A vacuum-driven apparatus is disclosed for moving a roller over a scribed wafer and maintaining an optimum force of the roll against the wafer in order to reduce the number of dice having chipped edges.

15 Claims, 8 Drawing Figures

INVENTOR.
ARTHUR H. MOORE
BY
Limbach, Limbach & Sutton
ATTORNEYS

INVENTOR.
ARTHUR H. MOORE
BY
Limbach, Limbach & Sutton
ATTORNEYS

INVENTOR.
ARTHUR H. MOORE
BY
Limbach, Limbach & Sutton
ATTORNEYS

INVENTOR.
ARTHUR H. MOORE
BY
Limbach, Limbach & Sutton
ATTORNEYS

INVENTOR.
ARTHUR H. MOORE
BY
Limbach, Limbach & Sutton
ATTORNEYS

SEMICONDUCTOR WAFER FRACTURING TECHNIQUE EMPLOYING A PRESSURE CONTROLLED ROLLER

BACKGROUND OF THE INVENTION

This invention relates generally to techniques for production of miniature electronic circuits or components, and more specifically relates to a method and apparatus for fracturing a scribed semiconductor wafer into its individual semiconductor dice.

A widely used technique for producing very small integrated electronic circuit components is to build a very large number of the same circuit or component on a single wafer of silicon or other appropriate material. In this manner, the large number of circuits or components may be formed by a single operation. Each of the circuits or components may typically be in the order of 1 or 2 millimeters square, several hundred or more of such circuits or components being formed on a single silicon wafer. The circuits or components on a single wafer may be identical or there may be several types on a single wafer.

After such a wafer is formed, the individual circuits or components are separated from one another by scribing the wafer around each of the circuits or components. The wafer is preferably laid out so that the scribed lines are either parallel or perpendicular to one another. Individual circuit or component dice are then separated from one another by passing a roller over the wafer and exerting pressure thereagainst. The roller is passed over the waver twice, a first time being parallel with one set of parallel scribed lines and a second time being parallel with the other set of parallel scribed lines. The individual dice are then installed into an appropriate casing or electronic circuit with conductive leads attached thereto.

The predominant technique presently employed for passing a roller over a scribed wafer involves a hand operation by a worker. The controlling of a roller against a wafer by hand has not proved entirely satisfactory because a significant number of the fractured dice have chipped edges which make them unusable. It is the primary object of the present invention to provide a method and apparatus for breaking a wafer into its individual dice by the use of a roller in a manner to reduce the number of dice with chipped edges.

SUMMARY OF THE INVENTION

This and additional objects of the present invention are realized by passing a roller over a scribed wafer with a carefully controlled force against the wafer and a carefully controlled orientation relative to the scribed lines. There is a minimum force required to fracture a wafer along a scribed line. The magnitude of this force depends upon the material of the wafer, its thickness and the depth of the scribing, as well as other factors. An excessive force of a roller against a scribed wafer can cause the individual die to have chipped edges. Besides harming the individual die, such edge chipping also produces undesirable dust which usually must be removed prior to utilizing the individual die in an electronic circuit. Therefore, the optimum force of a roll against a scribed die is that force which will result in fracturing along the scribed lines without producing an excessive number of dice with chipped edges.

Another cause of chipped edges on an individual die is an improper orientation of the roll with respect to the scribed lines. The roll being use to fracture a scribed wafer should be rolled thereover with an orientation as nearly parallel to the scribed lines as possible. The optimum force of the roll against the wafer and the parallel orientation relative thereto is difficult to obtain and control by hand-rolling techniques.

Additionally, it has been found that the optimum force of a roll against a given scribed wafer is different for the second pass of a roll over the wafer than for the first pass. In the first pass of a roll over a given wafer, more force is required to fracture the wafer than is required for the second pass of the roll thereover. Therefore, the optimum force of the roll against a scribed wafer for the first pass is too much force to be used in the second pass. Therefore, the two passes of a roll over a scribed wafer are made with different forces of the roll against the wafer. This force differential is also difficult to control by hand operation of the roll.

Therefore, the present invention also includes a novel machine designed specifically for operating a roll against a scribed wafer with the important force and orientation parameters as outlined above carefully controlled within optimum limits. This machine includes generally a rubber pad covered plate for supporting a scribed wafer and a mechanism for moving a roller across the support plate along a single path, first in one direction and then in a reversed direction to its starting position. The wafer support plate is rotated 90° between the two passes of the roller thereover. The roll is journaled at its ends into the shuttle assembly and additionally is supported along at least a portion of its length by a Teflon bearing held for contact at the top of the roll to provide a uniform force of the roll against a wafer.

The force of the roll against a wafer on the support plate is controlled by at least one piston within the shuttle assembly that pushes downward on the roll assembly. The downward force on the roll is made greater during the first pass of the roll over the wafer than during the second pass by an appropriate adjustment of the force controlling piston between the forward and backward passes.

The shuttle assembly is carefully controlled to follow the same path during its two passes over the scribed wafer. The rotation of the wafer support plate is adjustable in order that a wafer's scribed lines may be made parallel with the roller. Additionally, the roller assembly is made removable from the shuttle assembly so that rolls of different diameters may be substituted, depending upon the spacing between the parallel scribed wafer lines.

The wafer support plate is preferably provided with a plurality of apertures for connection with a vacuum system. A thin plastic cover is placed over the wafer and support plate when a vacuum system is utilized. The vacuum draws the cover tightly down onto the wafer and thus prevents dust created by the fracturing from escaping the area of the broken dice edges. Therefore, dust is prevented from migrating onto the surface of the individual dice and thus makes a subsequent and difficult washing of the dice unnecessary. Furthermore, the use of a thin plastic cover and a vacuum positioning system makes it possible for expanding the fractured die matrix by existing techniques wherein a thin plastic carrier is heated and stretched.

In a preferred embodiment of the apparatus according to the present invention, all of the mechanical elements are driven by a vacuum or an air pressure. The wafer fracturer is connected to external sources of vacuum and air pressure. No electricity or other power is necessary for the operation of the wafer fracturing machine of the preferred embodiment. The use of air pressure for powering the wafer fracturer has a particular advantage in the operation of the piston which controls the force of the roller against the wafer. This piston force may be easily changed between two predetermined values simultaneously with the roller changing its direction of movement across the wafer. The shuttle assembly for moving the roller back and forth across the wafer is also powered by air pressure in the preferred embodiment. Additionally, the rotatable wafer support plate is held in a fixed position during the rolling operation by a vacuum lock.

Additional ojbects and advantages of the present invention in its various aspects will become apparent from the following description of the preferred embodiment when taken in conjunction with the accompanying drawings.

DESCRIPTION OF THE PREFERRED EMBODIMENTS

Figure 1:
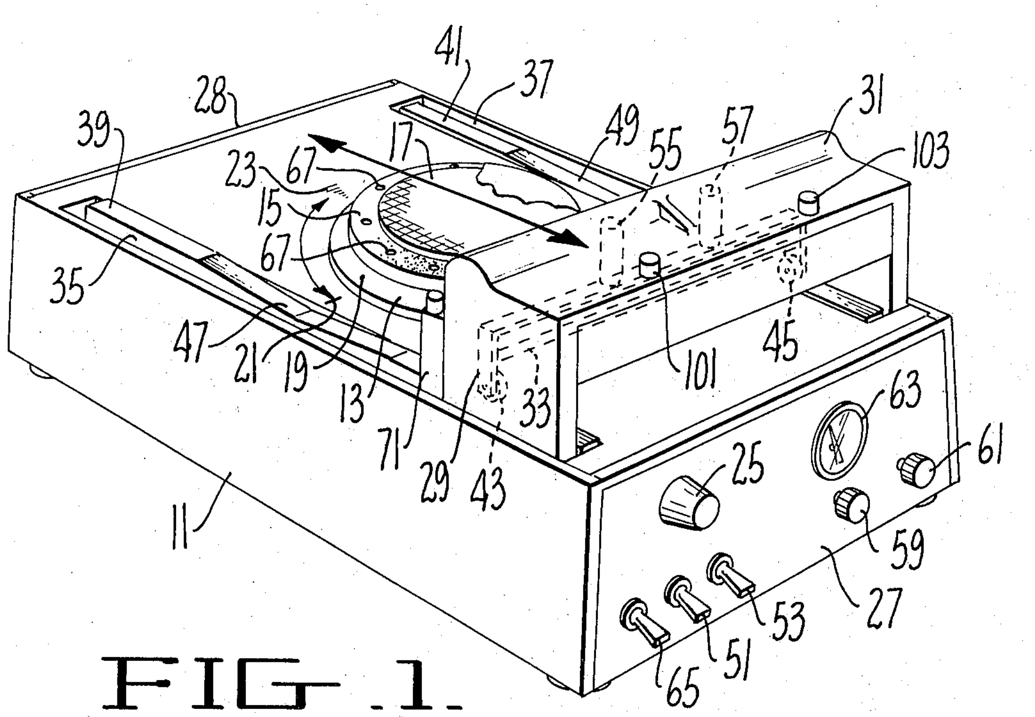
FIG. 1 is a perspective view of the outside of a wafer fracturer that incorporates the various aspects of the present invention.

A specific machine employing the various aspects of the present invention is illustrated generally in FIG. 1. A machine is enclosed by an outside casing which is indicated generally by the reference character 11. On the top of the machine is a wafer support plate 13. The wafer support plate 13 preferably has a metal base covered with a layer 15 of a soft plastic material (such as rubber) that is permanently attached to the metal base of the wafer support plate 13. A scribed silicon wafer 17 is placed on the top surface of the rubber layer 15 during the fracturing operation.

The support plate 13 may be rotated directly by hand relative to the machine cover 11 an arc distance of 90°. For instance, a point 19 on the support plate 13 is aligned by hand rotation of the support plate with either a position 21 on the top of the cover 11 or a position 23. The support plate is positively held at either of these positions by a mechanical detent means. Fine adjustment of the rotational position of the support plate 13 for proper alignment of the silicon wafer 17 is provided by a knob 25 on a front panel 27 of the machine casing 11.

A roller assembly 29 is carried by a shuttle assembly 31 back and forth across the wafer support plate 13. A roller 33 is rotatably supported at both of its ends by the roller assembly 29. The roller assembly 29 is made removable from the shuttle assembly 31 so that different roller assemblies having various diameter rolls may be interchanged therein. The roll size is dependent on the size of the individual die of a silicon wafer to be fractured.

The shuttle assembly 31 is supported through a pair of parallel slots 35 and 37 which extend between the front panel 27 and a rear panel 28 of the machine casing 11 in its top surface. A pair of parallel guide rails 39 and 41 extend parallel with and adjacent to the slots 35 and 37. The guide rails 39 and 41 support the roller assembly 29 in a vertical position through its bearing rollers 43 and 45. The guide rails 39 and 41 have depressed portions 47 and 49 midway between their ends in a position adjacent the wafer support plate 13. The depressions 47 and 49 allow the roller 33 to lower itself into contact with the wafer 17 as the shuttle assembly 31 is driven across the support plate 13.

The shuttle assembly 31 is first driven backward towards the rear panel 28 of the machine from the position shown in FIG. 1. The shuttle assembly 31 is then driven forward from the rear panel 28 across the wafer 17 to its rest position shown in FIG. 1. Between the backward pass and the forward pass of the shuttle assembly 31 across the silicon wafer 17, the wafer support plate 13 is rotated directly by hand a fixed amount of 90°. Thus, complete fracturing of the wafer 17 is accomplished by the back and forward passes of the shuttle assembly 31 across the wafer support plate 13.

All mechanical operations of the machine illustrated in the figures are powered by separate external air pressure and vacuum sources that are connected by hoses to connectors on the rear panel 28 of the machine. Those functions not mechanized, of course, are the rotation of the support plate 13 and placement of the silicon wafer 17 in a proper position by hand, as have been discussed previously.

The direction that the shuttle 31 is caused to move across the machine is controlled by a shuttle direction air switch lever 51. In the position of the lever 51 shown in FIG. 1, the pneumatic air pressure system of the machine is set to drive the shuttle assembly in a forward direction from the rear of the machine toward the front plate 27. When the lever 51 is pushed upward into its second switch position, the pneumatic system of the machine is set to move the shuttle assembly back away from the front panel 27 of the machine toward its rear panel 28. Power is applied to a driving means for the shuttle assembly 31 when an air switch lever 53 is pushed to its upright position. The air switch lever 53 is shown in FIG. 1 to be in an "off" position which leaves the shuttle assembly without power.

The force that the roll 33 exerts against the wafer 17 as it is passed thereover by motion of the shuttle assembly 31 is controlled by a pair of pneumatic pistons 55 and 57 that are installed in the shuttle assembly 31. The downward force of these pistons is controlled by rotating pressure adjust knobs 59 and 61 located on the front panel 27 which control the amount of air pressure that drives the pistons 55 and 57. This air pressure is monitored by a pressure gauge 63. The adjustment knob 59 adjusts the force that the pistons 55 and 57 exert against the roller assembly 29 during the backward motion of the shuttle assembly 31 toward the rear panel 28. The knob 61 adjusts the force that the pistons 55 and 57 exert against the roller assembly 29 during forward motion of the shuttle assembly 31 in a direction toward the front panel 27.

A further control is provided in the front panel 27 for locking the support plate 13 against any rotation while the shuttle assembly is operating to pass the roller 33 across the wafer 17. A vacuum switch lever 65 is provided in the front panel 27 of the machine to turn on or off a vacuum underneath the support plate 13. When this vacuum is turned on, atmospheric pressure forces the support plate 13 downward and frictionally holds it against rotation.

Figure 6:
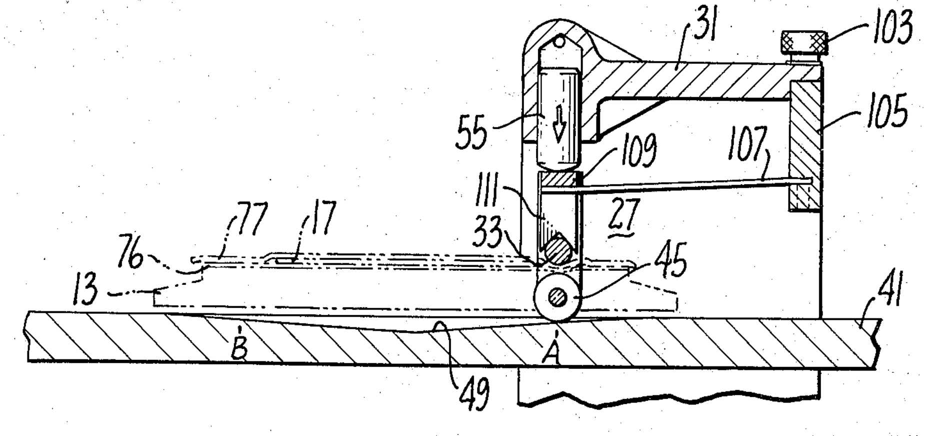
FIG. 6 is a sectional view taken across 6—6 of FIG. 5.

Before describing in detail the mechanical structure of the wafer fracturer shown in the drawings, its operation to fracture a single wafer will be described briefly. A thin tissue paper 76 (FIGS. 3 and 6) is first placed on the top of the rubber pad 15. This tissue paper should be large enough to cover vacuum ports 67 which extend through the surface of the pad 15. The tissue paper is chosen to be very porous so that the vacuum applied thereto through the ports 67 is spread evenly over the surface of the rubber pad 15. The silicon wafer 17, having been scribed by well known techniques, is placed with its scribed lines face down on top of the tissue paper. The silicon wafer 17 is shown, however, in the drawings with its scribed lines as if they were facing upwards but this is only a means for easily identifying the silicon wafer 17 from the other elements on the support assembly 13.

Figure 2:
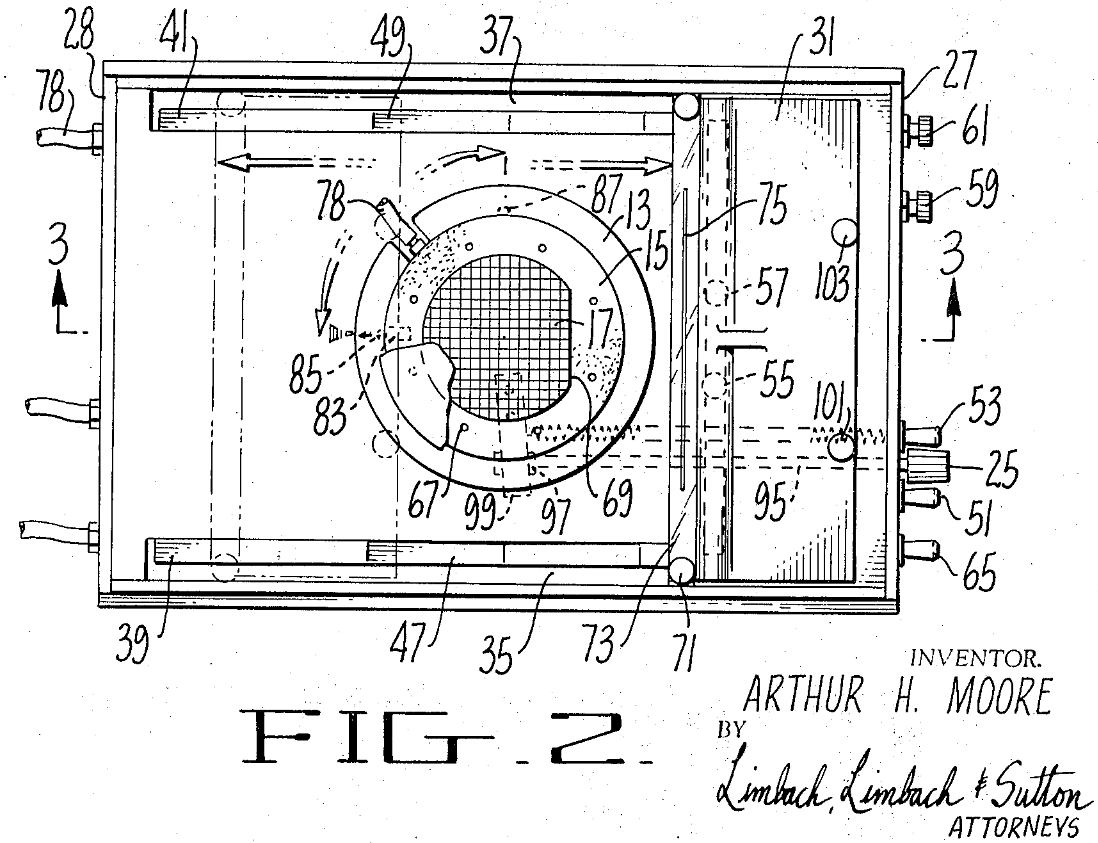
FIG. 2 is a top view of the wafer fracturer of FIG. 1.

The typical wafer 17 to be fractured is generally of circular shape with one flat edge 69 (FIG. 2) that is provided parallel to one set of scribed lines for the purpose of aligning the wafer 17 with the roller 33. The wafer 17 is positioned on the pad 15 with the aid of an alignment fixture 71 that is supported through the same slots 35 and 37 of the machine cover 11 through which the shuttle assembly 31 is supported. The alignment fixture includes a clear plastic strip 73 extending across the width of the top of the machine. The strip 73 has a visible line 75 (FIG. 2) which is maintained parallel to the roller 33 as a result of the common support shared by the alignment fixture 71 and the shuttle assembly 31. The alignment fixture 71 may be manually moved from the position shown in FIGS. 1 and 2 to a position over the rubber pad 15 for aligning the edge 69 of the silicon wafer 17 with the alignment line 75 of the alignment fixture 71. The silicon wafer 17 is moved manually to obtain the proper alignment. A fine adjustment of this alignment is made possible by the knob control 25 which rotates the wafer support plate 13 slightly.

After the wafer is aligned, a thin flexible plastic sheet 77 (FIGS. 3 and 6) is positioned to provide a cover for the wafer 17. Although the wafer can be fractured by the roller 33 contacting the wafer directly, use of a covering sheet is preferred. The plastic sheet 77 should also cover the vacuum ports 67 so that it will be tightly drawn against the wafer 17. During the time that the filter paper 76, the silicon wafer 17 and the covering sheet 77 are positioned on the wafer support pad 15, a vacuum is applied to the port 67 through a hose connection 78 with the wafer support plate 13. The vacuum hose 78 is removably plugged into a receptacle provided in the rear panel 28 of the machine. This allows the support plate 13 and the hose assembly 78 to be completely removed from the machine, a feature that is highly desirable after a wafer is fractured for transfering the fractured wafer to a die matrix expander. A vacuum is supplied through the vacuum ports 67 throughout the fracturing of the wafer 17.

Figure 7:
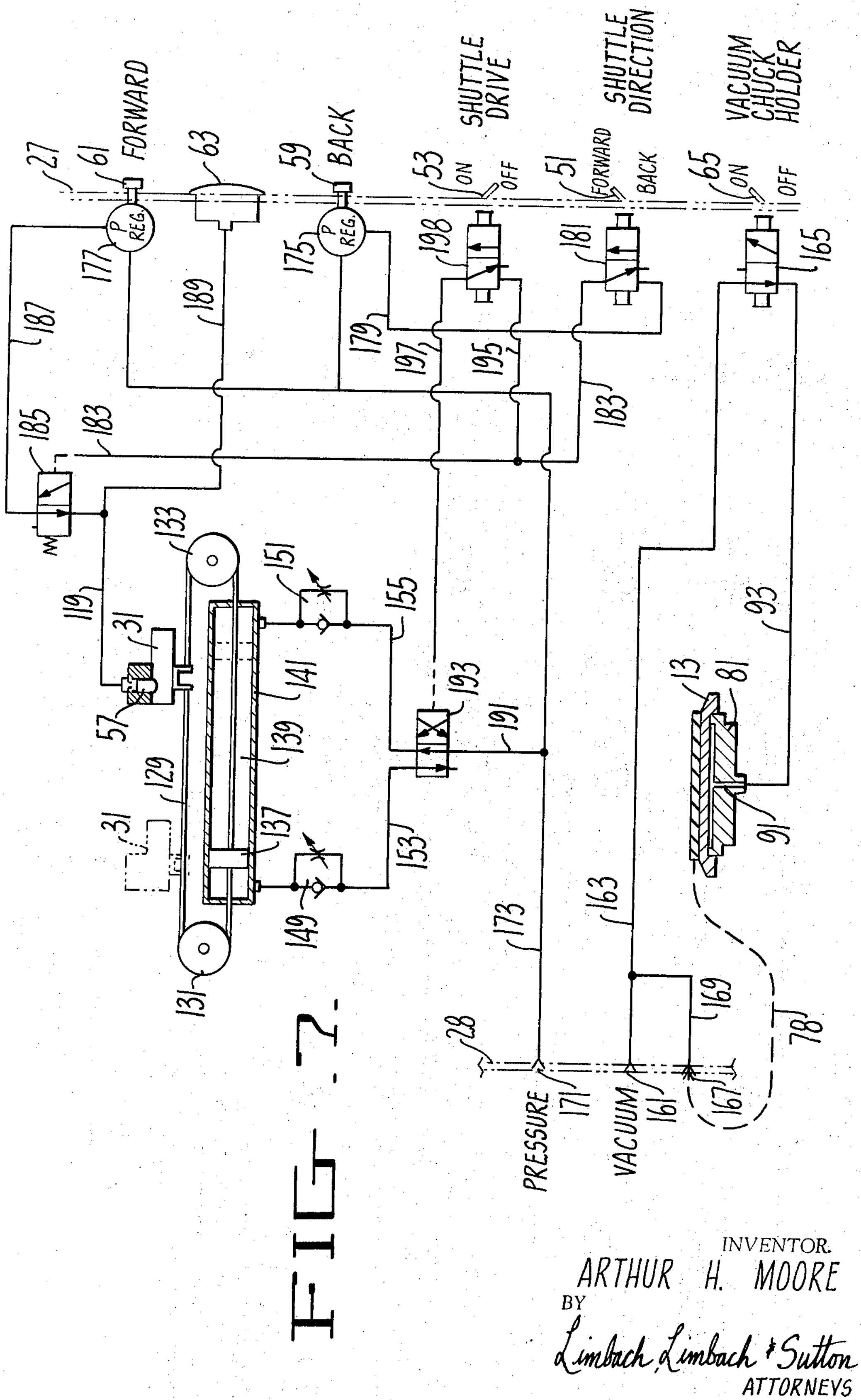
FIG. 7 is a schematic diagram of the vacuum and pressure system of the wafer fracturing machine shown in FIGS. 2–6.

When the silicon wafer 17 is properly aligned, the filter paper 76 and the plastic covering film 77 are properly positioned, and a vacuum provided at the ports 67, as described above, the vacuum switch handle 65 is pushed upward to apply a vacuum to the wafer support plate 13 to hold it firmly in its aligned position during the fracturing of the wafer 17. If the force against the roller has not been adjusted individually for the forward and backward operations of the shuttle assembly 31, the pressure control knobs 59 and 61 are so adjusted. The knob 51, controlling the pressure of the roller against the silicon wafer 17 during the backward stroke of the shuttle assembly 31 toward the rear panel 28, is adjusted while the air pressure switch lever 51 is in the downward position shown in FIG. 1. After the knob 59 is turned to bring about a pressure indication on the pressure gauge 63 that is desired for the backward stroke of the shuttle assembly 31, the switch lever 51 is thrown to its upright position (as shown in FIG. 7) and the knob 61 is turned for adjustment of the pressure of the roller against the silicon wafer 17 during the forward motion of the shuttle assembly 31 between the rear panel 28 and the front panel 27.

After these adjustments are made, the machine is ready to perform a fracturing of the silicon wafer 17. The switch 51 is first positioned in its down position to connect the air pressure system in a manner ready to drive the shuttle assembly 31 in a backward direction away from the front panel 27 and toward the rear panel 28 of the machine. The lever 53 is then positioned upward which operably connects the air pressure system with the shuttle drive assembly 31. The shuttle assembly 31 will move across the silicon wafer 17 until it reaches its position closest to the rear plate 28 of the machine where it will stop. The wafer support plate 13 is then rotated 90°, from one detent position to the other detent position. The lever 51 is then moved to its upper position which causes the shuttle assembly 31 to move in a forward direction toward the front panel 27. The pressure of the roller against the silicon wafer 17 is adjusted to be greater during the backward pass than during the forward pass of the shuttle assembly 31 over the wafer 17 in accordance with the adjustments previously made by the independent pressure adjustment knobs 59 (backward direction) and 61 (forward direction).

Convenient diameters of the roll 33 for separate interchangeable roll assemblies are 1/16, ⅛, ¼, and ½ inch. The smallest diameter roll is used to fracture a wafer with very small die sizes. A 1/16 inch diameter roll is effectively used with dice in the order of 0.01 to 0.02 inch square. The plasticity of the rubber pad 15 is preferably about 80 durometer for a 1/16 or ⅛ inch roll diameter and about 40 durometer for ¼ and ½ inch roll diameter.

Figures 3, 4:
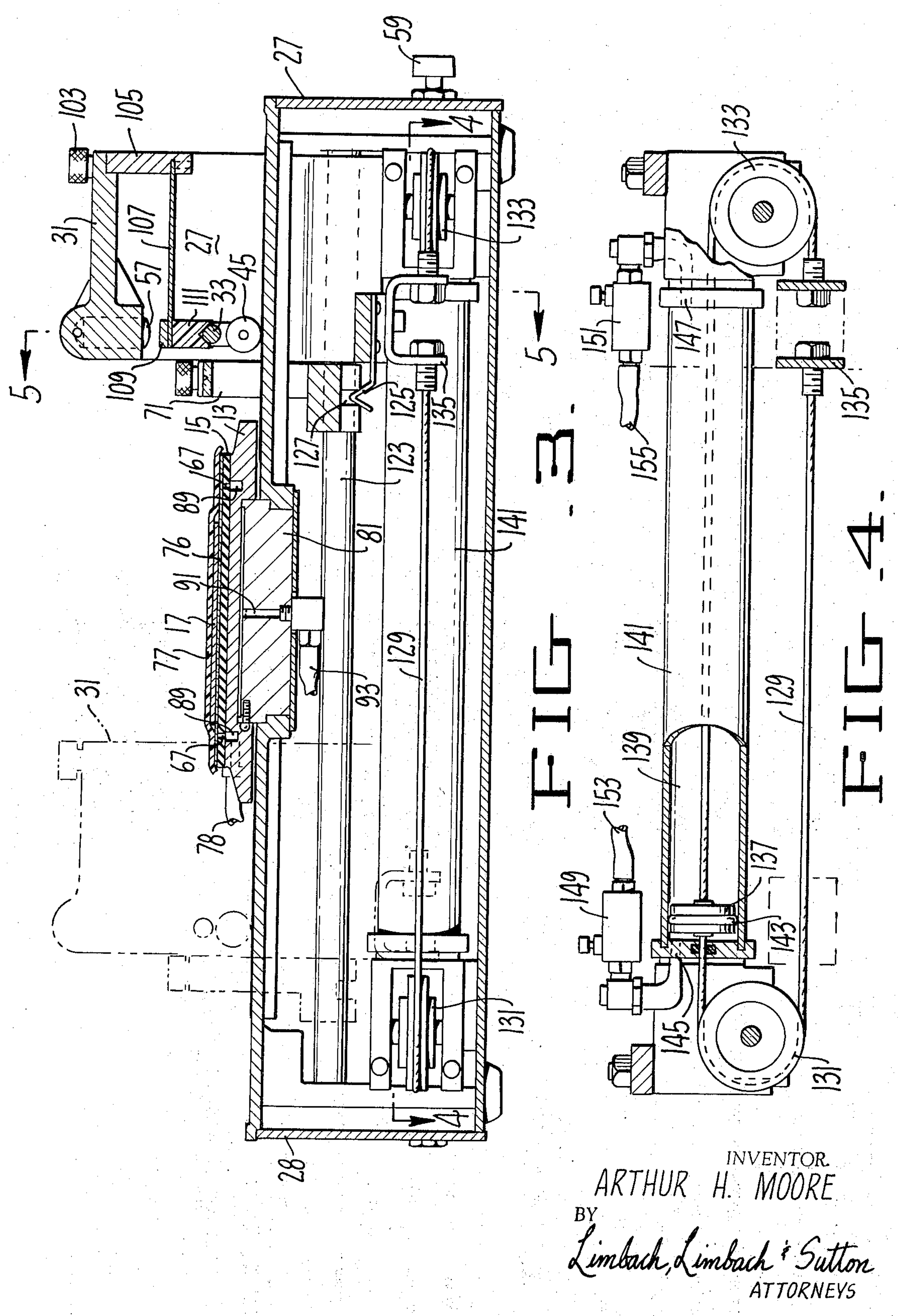
FIG. 3 is a sectional view taken across 3—3 of FIG. 2.
FIG. 4 is a sectional view taken across 4—4 of FIG. 3.

Details of the wafer support plate 13 and associated components are most clearly shown in the sectional view of FIG. 3. The support plate 13 contains a recess in its bottom of a generally circular shape for receiving a vacuum chuck 81. The vacuum chuck 81 contains a spring loaded ball detent 83 for engagement with either a notch 85 or 87 (FIG. 2) of the wafer support plate 13, the notches being separated an angular distance of 90°. Thus, two positive positions of rotation of the support plate 13 with respect to the vacuum chuck 81 are established, one for use when the shuttle assembly 31 is traveling in the backward direction and the other rotational position for use when the shuttle assembly 31 is traveling in a forward direction.

The vacuum openings 67 of the rubber pad 15 are connected by appropriate channels 89 in the wafer support plate 13 with the vacuum hose 78.

Figure 5:
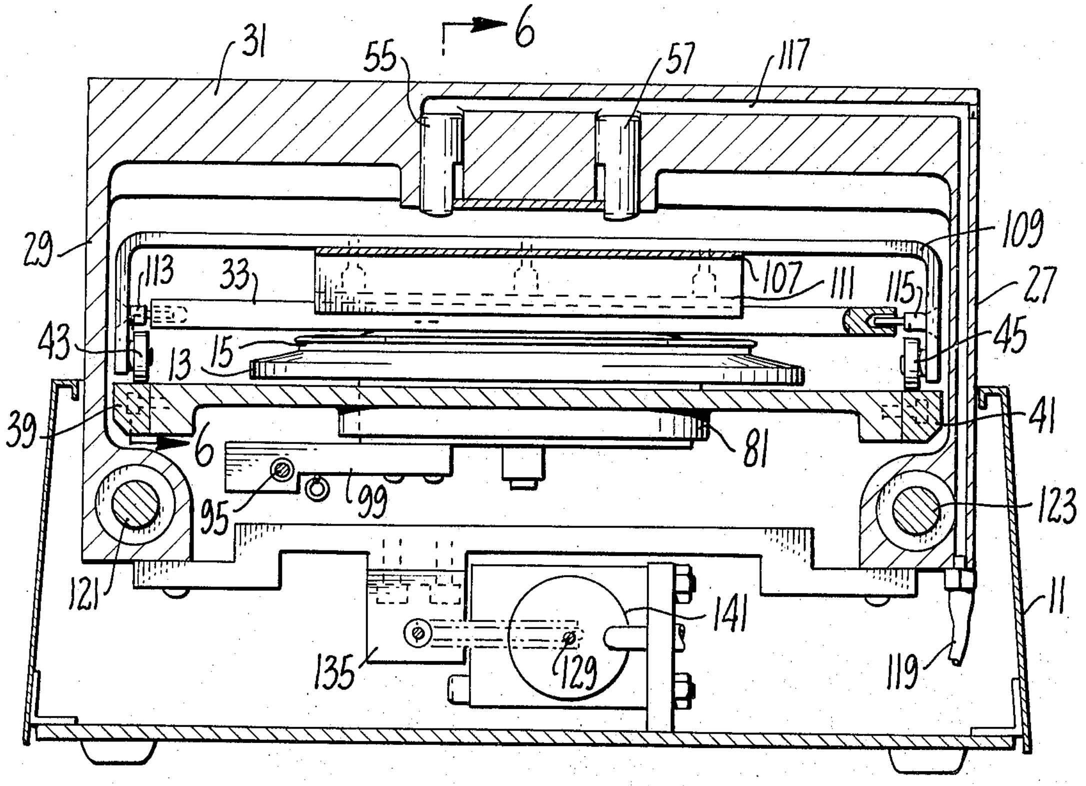
FIG. 5 is a sectional view taken across 5—5 of FIG. 3 after relocation of certain mechanical elements.

In order to hold the wafer support plate 13 fixed with respect to the vacuum chuck 81 during the period that the wafer is being fractured, an opening 91 is provided in the center of the vacuum chuck 81 for connection by means of a hose 93 to a vacuum source through the vacuum chuck holder on/off switch handle 65. A vacuum so provided to the passage 91 causes the wafer support plate 13 to press hard downward against the vacuum chuck 81 and thus holds the support plate 13 and the vacuum chuck 81 together. A fine rotational adjustment of the support plate 13 is accomplished by rotating a vacuum chuck 81 with respect to the machine casing 11 by a mechanical connection between the vacuum chuck 81 and the front panel fine adjustment knob 25. This mechanical adjustment can best be seen from FIG. 2 wherein a shaft 95 that is fixed to the knob 25 extends through the front panel 27. The shaft 95 is threaded at its end furthest from the knob 25 for receiving a mating threaded member 97. The threaded member 97 is fixedly attached to a lever 99. The lever 99 in turn is attached to the bottom of the vacuum chuck 81 (FIG. 5).

The roller assembly 27 is held in the shuttle 31 by a pair of captured knobs 101 and 103 (FIGS. 1 and 3). The roller assembly 27 is shown in cross section in FIG. 3 and by an end view in FIG. 5 wherein a frame member 105 has a leaf spring 107 fixedly attached thereto. At the opposite end of the leaf spring 107 a support bar 109 is attached. A roller-bearing member 111, preferably made of a Teflon material, is also attached to the leaf spring 107 and to the bar 109. As can best be seen from FIG. 5, the frame bar 109 is bent at either end to form an inverted U-shaped frame member between which the roller 33 is held in a journaled relationship between journal members 113 and 115 that are attached to the frame bar 109. The guide rollers 43 and 45 for following the tracks 39 and 41 are rotatably attached to the ends of the inverted U-shaped frame member 109.

Referring again to FIG. 3, it may be pointed out that the roller assembly 27 is removably attached to the shuttle assembly 31 by means of the knobs 101 and 103. When the knobs 101 and 103 are loosened, the roller assembly frame member 105 may be pulled from within the shuttle assembly 31. With the frame member 105 will come the leaf spring 107, the roll 33, the inverted U-shaped frame bar member 109 and all of the elements attached thereto. This feature allows for the substitution of another roller assembly for the one initially installed in the machine. Different roller assemblies can have different diameter sizes of rolls 33, thereby allowing use of a proper roll diameter for a particular scribed wafer to be fractured.

The roll 33 is supported by a flexible leaf spring member 107 so that the roll may follow the irregularity of the wafer 17 as it is rolled thereacross. As can be seen most clearly by FIG. 6, wherein the shuttle assembly 31 is removed a distance from the front panel 27 of the machine, the support roll 45 rides on the top surface of one of the parallel guide rails 41 upon the downward urging of the piston 55. Between about the points A and B in the depressed area 49 of the guide rail 41, the wheel 45 does not make contact with the guide rail 41. In this region, the force that counteracts the downward force of the piston 55 is the resistance of the wafer 17 and the wafer support member 13 to the roll 33 in contact therewith. It is between the positions A and B that the roll 33 asserts a rolling force on the wafer 17 and fractures it along its previously scribed lines.

Referring to FIG. 5, the downward force of the pistons 55 and 57 is generated by creating in an air pressure chamber 117 a pressure that is substantially greater than atmospheric pressure. The fluid path 117 exists as part of the shuttle assembly 31, terminating in a connection with a flexible hose 119. The hose 119 is connected with a high pressure source as discussed hereinafter with respect to the schematic diagram of FIG. 7.

The mechanism for guiding and driving the shuttle assembly 31 is best seen in FIGS. 3, 4 and 5. The shuttle assembly 31 slides back and forth between the front panel 27 and the rear panel 28 of the machine on guide rods 121 and 123. In the extreme positions, the shuttle assembly 31 is at rest near the front panel 27 of the machine in FIG. 3, while its opposite extreme position near the rear panel 28 of the machine and after passing over the wafer support plate 13 is shown in dotted outline at the left side of FIG. 3. The end of the guide rods 121 and 123 nearest the front panel 27 of the machine are firmly attached directly to an appropriate frame element of the machine. The opposite ends of the guide rods 121 and 123 which are near the rear plate 28 of the machine are held into the frame of the machine by an O-ring. The use of a flexible O-ring at one end of each rod prevents any binding of the shuttle assembly between the rods by giving some flexibility to one end of the rods.

The alignment fixture 71 also rides on the guide rods 121 and 123 and is normally attached to the shuttle assembly 31 by means of a spring detent 125 (FIG. 3) that is received by a notch 127 in the underside of the alignment fixture 71. When the alignment fixture 71 is to be used to align a new silicon wafer that is being positioned on the wafer support plate 13, the alignment fixture 71 is manually separated from the shuttle assembly 31 by pushing it hard enough so that the detent 125 is caused to slide out of the notch 127.

The air pressure drive for the shuttle assembly is best shown in FIGS. 3 and 4. A cable 129 is held by pulleys 131 and 133. The pulleys 131 and 133 are attached to the machine frame in a rotatable manner. A bracket 135 is connected with the cable 129 and is pulled along thereby. The bracket 135 is attached in a fixed manner to the shuttle assembly 31. Also attached to the cable 129 is a piston 137 that moves back and forth within a piston chamber 139 formed within an elongated cylindrical tube 141. The piston 137 has an O-ring 143 about its outside surface to form a fluid-tight seal with the inside surface of the cylindrical tube 141. As the piston 137 moves back and forth within the chamber 139, the shuttle assembly 31 moves back and forth along the guide rods 121 and 123.

The piston cylinder 139 is sealed to the outside except for orifices 145 and 147 at opposite ends thereof. Connected to the orifices 145 and 147 are independent fluid control valves 149 and 151 that are each adjustable by the user of the machine through appropriately positioned apertures in the bottom of the machine cover 11. The valves 149 and 151 may be of any convenient type which allows adjustment of the size of the fluid path therethrough. Small hoses 153 and 155 for carrying air under pressure are connected with the valves 149 and 151, respectively. When air pressure is applied to the cylinder 139 through the supply hose 153, the shuttle assembly 31 is moved back toward the rear panel 28. Conversely, when air pressure is supplied to the cylinder 129 through the air supply hose 155, a piston 137 is operated in a direction which moves the shuttle assembly 31 forward to a position near the front plate 27. As is discussed hereinafter with respect to the air pressure control circuit of FIG. 7, valve means are provided to exhaust the cylinder 139 through the orifice that is not being utilized for the supply of air pressure to the cylinder.

The vacuum and pressure system is shown schematically in FIG. 7. A connection 161 for a vacuum hose is provided in the rear panel 28 of the machine. A vacuum hose 163 that extends from the connector 161 is connected to the vacuum passage 91 of the vacuum chuck 81 through a vacuum hose 93 and a switch 165 connected in series therewith. The switch handle 65 on the front panel 27 of the machine operates the air switch 165. When the switch handle 65 is in its "on" position, the vacuum supply hose 163 is connected through in a vacuum-type manner to the vacuum hose 93 for reducing the pressure under the wafer support plate 13 and thus holds it fixed to the vacuum chuck 81. When the switch handle 65 is in the off position, the air switch 165 shuts off the vacuum hose 163 and opens the vacuum hose 93 to the atmosphere.

The convention utilized in FIG. 7 to show the air pressure valves may be observed with respect to the valve 165. Block "A" shows the line connections with the handle 65 in the on position shown. When the handle 65 is moved to the off position, the vacuum lines 93 and 163 are connected in a manner with the valve block "B" moved into the position occupied by the valve block A.

A second vacuum receptable 167 is also provided in the rear panel 28 of the machine. The vacuum connection 167 is connected by a hose 169 to the vacuum line 163. The vacuum receptable 167 is of the type to removably receive the vacuum hose 78 which is connected to the wafer support plate 13 for holding the wafer and its covering plastic sheet down against the support plate 13, as described hereinabove.

An air pressure receptacle 171 is also provided in the rear panel 28 for connection with an external source of high pressure air. An air pressure line 173 is connected within the machine to the receptacle 171. This air pressure is utilized as a motive source for moving the shuttle 31 back and forth across the wafer and for controlling the amount of pressure of the roller against the wafer. In a preferred embodiment of the machine, the air pressure in the line 137 is maintained at around 60 pounds per square inch.

The system for controlling the force exerted downward against the roller assembly by the pistons 55 and 57 will now be explained with respect to the schematic diagram of FIG. 7. The air pressure input line 173 is connected with a pressure regulator 175 and also with a pressure regulator 177. The pressure regulator 175 is connected with the knob 59 on the front panel 27 of the machine for controlling the pressure of the pistons 55 and 57 during movement of the shuttle assembly 31 back toward the rear panel 28 of the machine. The pressure regulator 177 is connected with the knob 61 on the front panel 27 of the machine for controlling the force exerted by the pistons 55 and 57 against the roller assembly when the shuttle 31 is travelling in a forward direction toward the front panel 27.

The output of the back pressure regulator 175 is connected by a pressure line 179 to an air switch 181. The air switch 181 is controlled by a shuttle direction switch handle 51 in the front panel 27 of the machine. When the switch handle 51 is in an upright position for driving the shuttle forward toward the front of the machine, as shown in FIG. 7, the air pressure line 179 is closed off while another air pressure line 183 connected to the air pressure switch 181 is open to the atmosphere. When the switch handle 51 is set downward to drive the shuttle back toward the rear of the machine, the pressure line 179 is connected with the pressure line 183. Thus, it can be seen that the air pressure line 183 is switched from a zero air pressure level when the switch handle 51 is in its "Forward" position to an air pressure level controlled by the pressure regulator 175 when the switch handle 51 is in its "Back" position. It is this differential of pressure in the line 183 which controls the direction of travel of the shuttle assembly 31 as well as determining a different air pressure against the pistons 55 and 57 for controlling the force of a roller against a wafer.

The air pressure line 183 is connected with a cock valve (poppet valve) 185. Also connected with the cock valve 185 is a pressure line 187 that is also connected to the output of the forward direction pressure regulator 177. The cock valve 185 acts as a switch which delivers to the pressure line 119 either the pressure output of the regulator 175 or that of the regulator 177.

The cock valve 185 is preferably of a type which has a ball therein normally spring-biased against an orifice connected with the pressure line 183. When the pressure in the pressure line 183 is greater than that in the pressure line 187, this ball is urged against its biasing mechanism to block off the orifice connecting the valve 185 with the pressure line 187. This in turn opens the orifice connecting the valve 185 with the pressure line 183. This switching is accomplished with the on/off air pressure switch 181 which controls the pressure in the pressure line 183 between either a zero or some upper pressure limit as set by the back pressure valve 175.

The machine illustrated herein is utilized with a roller pressure against the scored wafer to be greater during travel of the shuttle 31 toward the back of the machine than during the shuttle's forward return. Therefore, the pressure regulator 175 will always be set to have an air pressure in its pressure line 179 that is greater than the air pressure in the line 187 from the output of the pressure regulator 177. With the switch handle 51 in the forward position as shown in FIG. 7, the air pressure line 119 is connected with the same air pressure that exists in the line 187. When the switch handle 51 is moved to the back position, the air pressure in the line 119 rises to the higher value of the air pressure in the line 183. The pressure gauge 63 is connected to the line 119 by a pressure line 189, thus providing for advance setting of the forward and back air pressure against the pistons 55 and 57.

The air pressure system for driving shuttle assembly 31 back and forth across the wafer will now be described. The high pressure input line 173 has a branch pressure line 191 connected thereto for providing air pressure into the cylinder 139 to move the piston 137 back and forth, thus moving the shuttle assembly 31 back and forth by means of the flexible cable 129 connected with the piston 137. The shuttle assembly 31 is shown in FIG. 7 to be in its extreme position toward the front face 27 of the machine. The shuttle assembly 31 is shown to be dotted on the left side of the drawing in its extreme position toward the rear of the machine.

The high pressure line 191 is intercepted by a two-position air switch 193. The switch 193 is normally spring-biased internally and connected so that the air pressure from the line 191 is connected with the line 155 to drive the piston 137 in a direction to cause movement of the shuttle assembly 31 in a forward direction toward the front of the machine. The speed control valve 149 in the path of the air pressure line 153 controls the rate at which air is discharged from the cylinder 139 as the piston 137 moves in a direction to cause the shuttle 131 to move forward. The air pressure line 153 is normally connected to the atmosphere through the switch 193.

When it is desired to drive the shuttle assembly 31 back toward the rear of the machine, the switch handle 51 must be in its Back position. This establishes a high air pressure in the line 183. A line 195 is connected to the line 183 and is also connected through an air switch 198. When the switch handle 53 is moved to the on position, the air switch 198 connects the air pressure line 195 with an air pressure line 197. The high pressure in the line 197 throws the switch 193 to its second operating position. In this second operating position of the air switch 193, the line 153 is connected with the high pressure air line 191 while the line 155 is discharged into atmosphere at a rate set by the speed control valve 151. This is the opposite position of the switch 193 as is shown in FIG. 7.

When the shuttle assembly 31 is driven to its extreme position near the rear of the machine, as shown in dotted form in FIG. 7, it will stop until the switch handle 51 is moved to its Forward position. In this position, there is no pressure in the line 183 above atmospheric pressure and thus there is no longer any air pressure provided for operating the switch 193 and it returns to its initial spring-biased position shown in FIG. 7. When this occurs, the shuttle assembly 31 moves forward to the front of the machine.

Referring to the earlier figures, FIG. 3 for example, a flexible plastic covering sheet 77 has been indicated for positioning over the scribed wafer 17 before the fracturing operation is begun. The composition of this plastic material is preferably polyvinyl chloride No. C255 cadgo film manufactured by Dayco Corporation.

The use of this plastic material has an advantage, among others, of making compatible the wafer fracturing operation of the machine described hereinabove with an existing wafer die expander. After the fracturing of a given wafer has taken place by passing the shuttle assembly 31 back and forth over the wafer support plate 13, the plate 13 is lifted from the rest of the machine after the switch handle 65 is moved to the off position to release the vacuum holding the plate 13. The wafer support plate 13 is then inverted onto a heated metal plate which raises the temperature of the plastic film enough to cause the individual broken wafer die to adhere to the plastic material. The vacuum hose 78 is then disconnected from the vacuum receptacle 167 (FIG. 7) which causes a release of the plastic film and its adhered semiconductor dice from the vacuum support plate 13.

The plastic film with its fractured dice adhered thereto is then clamped between two rigid large diameter rings in a manner that the broken dice are positioned on top of the plastic film and in the center of the rings. A piston-like member is then driven upward from the bottom of the plastic film and relative to the rings to stretch the plastic film and thus separate the tiny semiconductor dice from one another so that they may be manually picked up.

While the plastic film is in a stretched condition, it is often desirable to attach a rigid substrate, such as a fiber ring, to the plastic film by some convenient means such as glue. This prevents the plastic from returning to its earlier contracted condition. The individual dice may be picked off the plastic film, therefore, at any time.

Figure 8:
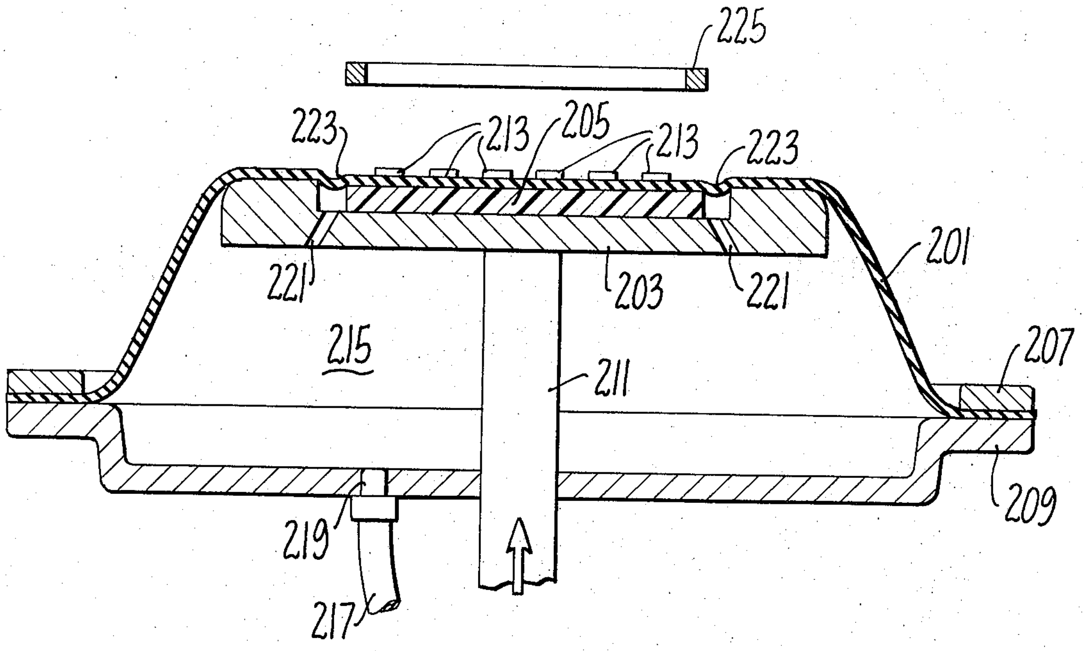
FIG. 8 is a partially cross-sectioned view of a matrix die expander for use with a wafer that has been fractured by the machine of FIGS. 1–7.

Another technique for separating the dice after fracturing has occurred is illustrated in FIG. 8. A thin plastic flexible sheet 201 of the type discussed before for covering a wafer prior to fracturing thereof is inverted after heating. The sheet 201 is carried by a metal disc 203 having a recess in its top portion for accepting a plastic disc 205. The plastic material 201 is clamped at its outer edges between a ring 207 and a frame portion 209 of the matrix expanding mechanism. A piston 211 is rigidly connected to the disc 203 and is given motion along its length by some convenient mechanism to drive the disc 203 against the plastic sheet 201 in order to stretch it. When the plastic material 201 has been stretched as desired, the individual semiconductor dice 213 are resultantly separated from one another.

The expander of FIG. 8 is constructed in a manner to form an air-tight chamber 215 formed by the plastic material 201 and a frame member 209 of the expanding mechanism. A vacuum hose 217 communicates with this chamber through a port 219 in the frame member 209. When a vacuum is applied through the hose 217, the pressure in the chamber 215 is reduced to a level below the normal atmospheric pressure on the outside of the plastic film 201. A plurality of apertures 221 are also provided in the disc 203 to communicate the chamber 215 with a recess of the disc 203 in which the plastic disc 205 is carried. The result of this is to draw the plastic 201 tightly against the plastic disc 205 around its edges. The edges are indicated generally at 223 of FIG. 8. The desirability of this vacuum for drawing the plastic film 201 into a very close relationship with the plastic disc 205 is to make the disc 205 useful as a carrier of the expanded die 213. The disc 205 preferably has a composition polyvinyl chloride.

The way in which the disc 205 becomes a carrier of the dice 213 is to adhere the plastic film 201 thereto around its edges by applying heat. A preferred way of doing this is by using a ring of material 225 having about the same outside diameter as that of the disc 205. The ring of material 225 is preferably a rubber gasket that is heated to a temperature of around 300° F. By an appropriate hand-held heating mechanism. As the ring 205 is pressed downward against the film 201, the heat applied thereto will cause an adhering of the film 201 to the disc 205. The excess plastic film 201 may then be cut away from around the plastic disc 205. The disc 205 then becomes a carrier of the plastic film 201 which is adhered directly thereto. The disc 205 also becomes a carrier of the expanded semiconductor dice that are adhered to the plastic film 201 by the earlier heating step which occurred immediately after fracturing of the dice. The disc 205 can be reused after all the dice are removed therefrom.

It will be understood that the above description of the preferred embodiments of the present invention are not limiting of the scope of the various aspects of the present invention as defined by the intended claims.

What is claimed is:

1. A method of fracturing a thin semiconductor wafer that has been scribed on one surface thereof with a plurality of parallel lines, a first set of parallel scribed lines making a finite angle with a second set of parallel scribed lines, comprising the steps of:

passing a cylindrical roller across said wafer in one direction, said roller having a center of rotation that is held parallel with said first set of parallel scribed lines, and passing said roller across said wafer a second time with the roller's axis of rotation parallel to said second set of scribed parallel lines, the force applied to the roller against the wafer being mechanically controlled to be less during the second pass than is the force during the first pass, whereby the semiconductor wafer is broken into its individual dice as defined by the intersecting sets of parallel scribed lines with less waste.

2. Apparatus for fracturing a thin semiconductor wafer, comprising:

a supporting frame, a wafer support plate held by said frame and rotatable therewith through a distance of at least 90° with respect to the supporting frame, said wafer support plate having an elastic material on its top surface to serve as a soft pad for supporting a scribed semiconductor wafer to be fractured, a shuttle assembly held by said supporting frame in a manner to be movable therealong in a straight line path first in one direction across said support plate and then in the other direction across said support plate, a roller assembly attached to said shuttle assembly and including a cylindrical roller for contacting a wafer carried by the support plate as the shuttle assembly is passed thereover in both directions, and adjustable means on said shuttle for forcing the roller downward to provide a controlled pressure of the roller against a wafer carried by the support plate, said adjustable means on said shuttle for forcing the roller downward includes means for applying a force during movement of the shuttle along said straight line path in said one direction over the support plate that is independent of the force applied during the movement of the shuttle in said second direction across the support plate.

3. Apparatus for fracturing a thin semiconductor wafer, comprising:

a supporting frame, a wafer support plate held by said frame and rotatable therewith through a distance of at least 90° with respect to the supporting frame, said wafer support plate having an elastic material on its top surface to serve as a soft pad for supporting a scribed semiconductor wafer to be fractured, a shuttle assembly held by said supporting frame in a manner to be movable therealong in a straight line path first in one direction across said support plate and then in the other direction across said support plate, a roller assembly attached to said shuttle assembly and including a cylindrical roller for contacting a wafer carried by the support plate as the shuttle assembly is passed thereover in both directions, said roller assembly includes a leaf spring for supporting the roller at one end thereof through a bracket, and adjustable means on said shuttle for forcing the roller downward to provide a controlled pressure of the roller against a wafer carried by the support plate, wherein the adjustable means on said shuttle for forcing the roller downward against the wafer applies a downward force against said roller assembly bracket.

4. Apparatus according to claim 3 wherein said adjustable means for forcing the roller downward includes a piston held by said shuttle assembly whose downward force is controlled by the amount of air pressure applied to a piston driving chamber.

5. Apparatus according to claim 4 which additionally includes valve means for applying a different air pressure when the shuttle assembly is driven in said one direction than the air pressure when the shuttle assembly is driven in said other direction.

6. Apparatus according to claim 2 wherein said wafer support plate includes a plurality of vacuum ports which extend through the elastic material, and means are provided for connecting said plurality of ports to a vacuum source.

7. Apparatus according to claim 2 which additionally comprises a vacuum means for holding the wafer support plate fixed to said frame against rotation when the shuttle assembly is passed thereover.

8. Apparatus according to claim 2 that additionally comprises an elongated air pressure cylinder having a piston therein that is mechanically connected to said shuttle assembly, thereby to move the shuttle assembly back and forth over the wafer support plate as the piston is moved back and forth within said air pressure cylinder.

9. Apparatus according to claim 8 wherein said air pressure cylinder additionally includes a pair of air pressure ports, one port at each end of said cylinder, and a valve means is provided for switching high pressure air from one of said pair of ports to the other, thereby controlling the direction of travel of said shuttle assembly.

10. Apparatus according to claim 9 wherein said valve means for switching high pressure air between said pair of ports includes means for adjusting the size of each of the pair of ports to air being exhausted from said cylinder, thereby providing a control of the shuttle speed.

11. An apparatus for fracturing a thin semiconductor wafer, comprising:

a supporting frame, a wafer support plate held by said frame and rotatable therewith through a distance of at least 90° with respect to the supporting frame, said wafer support plate having an elastic material on its top surface to serve as a soft pad for supporting a scribed semiconductor wafer to be fractured, a shuttle assembly held by said supporting frame in a manner to be movable therealong in a straight line path first in one direction across said support plate and then in the other direction across said support plate, an air pressure cylinder having a piston therein that is driven between ends of the cylinder by air pressure applied thereto at two independent ports at opposite ends of the cylinder, means for mechanically connecting said piston to the shuttle, whereby application of air pressure to one of said ports causes the shuttle assembly to travel in said one direction over the wafer support plate and application of air pressure to the other of said ports causes the shuttle assembly to travel in said other direction across said wafer support plate, a roller assembly attached to said shuttle assembly and including a cylindrical roller for contacting a wafer carried by the support plate as the shuttle assembly is passed thereover in both directions, means in said shuttle driven by air pressure for a downward force against said roller assembly in order to cause the roller to exert pressure against a wafer carried by the support plate that is greater than the weight of the roller assembly alone, and an air pressure control circuit including a valve means for applying a first air pressure to said means for exerting a downward force when a piston driving air pressure is applied to one of said cylinder air pressure ports and for applying a second air pressure to said means for exerting a downward force when a piston driving air pressure is applied to the cylinder when air pressure is applied to the second of said cylinder air pressure ports, whereby the roller pressure against a wafer can be independently controlled for each direction of travel of the shuttle assembly.

12. A method of fracturing a semiconductor wafer that has been scribed on one surface thereof with a first set of parallel lines and a second set of parallel lines that cross each other orthogonally in a manner to define substantially square shaped dice therebetween, comprising the steps of:

passing a cylindrical roller across said wafer in one direction, said roller having a center of rotation that is held parallel with said first set of parallel scribed lines, and passing said roller across said wafer a second time with the roller's axis of rotation parallel to said second set of scribed parallel lines, the pressure applied to the wafer through the roller being controlled to be less during the second pass than is the pressure during the first pass.

13. A method of fracturing a semiconductor wafer that has been scribed on one surface thereof with a first set of parallel lines and a second set of parallel lines that cross each other orthogonally in a manner to define substantially square shaped dice therebetween, comprising the steps of:

passing a cylindrical roller across said wafer in one direction, said roller having a center of rotation that is held parallel with said first set of parallel scribed lines, and passing said roller across said wafer a second time with the roller's axis of rotation parallel to said second set of scribed parallel lines, the force applied to the roller against the wafer being controlled to be less during the second pass than is the force during the first pass.

14. An apparatus for fracturing a semiconductor wafer that has been scribed on one surface thereof in two intersecting sets of parallel lines, comprising:

a support plate for holding a semiconductor wafer, a roller, means for providing relative movement between said roller and said support plate in a manner that the roller rolls across the support plate in two different directions thereby to contact a wafer placed thereon, and means for independently setting the force of the roller against said support plate in each of said two different directions.

15. Apparatus according to claim 14 wherein a single operator control mechanism selects both the direction of relative travel between the roller and support plate and the corresponding force therebetween as well.

* * * * *